(12) United States Patent
Fritzsch et al.

(10) Patent No.: US 11,549,540 B2
(45) Date of Patent: Jan. 10, 2023

(54) EXTENSION ADAPTER OF A PLUG-IN COUPLING AND ASSOCIATED PRODUCTION AND INSTALLATION METHOD

(71) Applicant: BÖLLHOFF VERBINDUNGSTECHNIK GmbH, Bielefeld (DE)

(72) Inventors: Jasmin Fritzsch, Werther (DE); Heinrich Heinrichs, Vlotho (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 1083 days.

(21) Appl. No.: 16/099,826

(22) PCT Filed: Mar. 15, 2017

(86) PCT No.: PCT/EP2017/056081
§ 371 (c)(1),
(2) Date: Nov. 8, 2018

(87) PCT Pub. No.: WO2017/194226
PCT Pub. Date: Nov. 16, 2017

(65) Prior Publication Data
US 2019/0113064 A1 Apr. 18, 2019

(30) Foreign Application Priority Data

May 9, 2016 (DE) .......................... 202016102474.9

(51) Int. Cl.
*F16B 21/06* (2006.01)
*F16B 21/07* (2006.01)

(52) U.S. Cl.
CPC .......... *F16B 21/065* (2013.01); *F16B 21/073* (2013.01)

(58) Field of Classification Search
CPC ........ F16B 21/00; F16B 21/06; F16B 21/073; F16B 21/078; F16B 19/04; F16J 1/18; Y10T 403/32032
See application file for complete search history.

(56) References Cited

U.S. PATENT DOCUMENTS

| 1,186,428 A * | 6/1916 | Newman ................. F21V 21/29 248/276.1 |
| 5,383,738 A * | 1/1995 | Herbermann .............. B25J 9/06 248/288.51 |

(Continued)

FOREIGN PATENT DOCUMENTS

| CN | 1350942 A | 5/2002 |
| CN | 200952621 Y | 9/2007 |

(Continued)

OTHER PUBLICATIONS

English translation of the International Preliminary Report on Patentability for PCT/EP2017/056081 dated Nov. 13, 2018, (8 pages).

(Continued)

*Primary Examiner* — Daniel J Wiley
(74) *Attorney, Agent, or Firm* — Reising Ethington P.C.; Matthew J. Schmidt

(57) ABSTRACT

An extension adapter of a plug-in coupling, with which a free space between a male coupling element and a female coupling element can be bridged in a connecting manner and which comprises the following features: a male coupling end which can be inserted into the female coupling element, a female coupling end in which the male coupling element can be received and which is connected to the male coupling end via an intermediate piece, and a locking element which is displaceably arranged in the axial direction of the extension adapter and with which, in a locking position surrounding (Continued)

Figure 1:
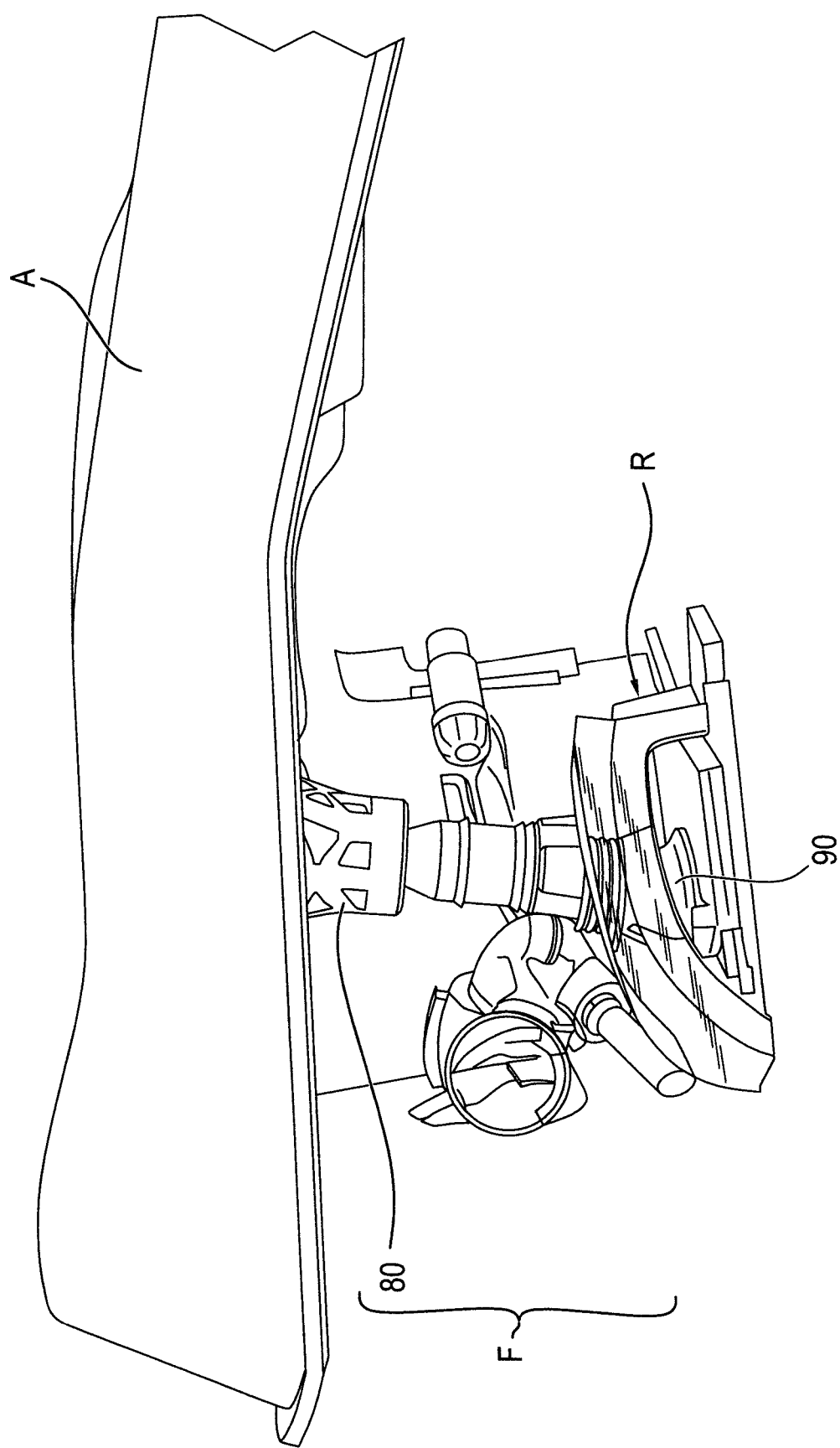

the female coupling end, the release of a male coupling element from the female coupling end is prevented.

19 Claims, 11 Drawing Sheets

(56) References Cited

U.S. PATENT DOCUMENTS

| | | | |
|---|---|---|---|
| 5,647,713 | A | 7/1997 | Ge et al. |
| 6,173,998 | B1 | 1/2001 | Bock |
| 6,767,153 | B1* | 7/2004 | Holbrook ............ F16C 11/0604 403/115 |
| 8,403,356 | B2 | 3/2013 | Tago et al. |
| 8,685,023 | B2 | 4/2014 | Dorawa et al. |
| 2002/0163180 | A1 | 11/2002 | Kirby |
| 2003/0180088 | A1* | 9/2003 | Carnevali ............ F16M 11/14 403/56 |
| 2008/0093516 | A1* | 4/2008 | Bevirt ................. F16M 11/16 248/181.1 |
| 2011/0057423 | A1 | 3/2011 | Tago et al. |
| 2011/0303053 | A1 | 12/2011 | Schneider et al. |
| 2017/0061035 | A1* | 3/2017 | Shinners ............ B21D 39/046 |
| 2018/0252252 | A1 | 9/2018 | Fritzsch et al. |

FOREIGN PATENT DOCUMENTS

| | | |
|---|---|---|
| CN | 202883566 U | 4/2013 |
| CN | 103375460 A | 10/2013 |
| DE | 3232926 A1 | 3/1984 |
| DE | 19721314 A1 | 11/1997 |
| DE | 19831897 A1 | 1/2000 |
| DE | 20107949 U1 | 10/2001 |
| DE | 202004006969 U1 | 7/2004 |
| DE | 202009007483 U1 | 10/2010 |
| DE | 202015005870 U1 | 11/2016 |
| FR | 2932235 A1 | 12/2009 |
| GB | 1332397 A | 10/1973 |
| GB | 2375568 B | 12/2004 |

OTHER PUBLICATIONS

CN Office Action for CN Application No. 201780035845.6 dated Jan. 6, 2020 (9 pages).

Written Opinion & International Search Report for PCT/EP2017/056081 dated May 19, 2017, 13 pages.

EP Office Action for EP Application No. 17711622.5 dated Oct. 13, 2020 (5 pages).

* cited by examiner

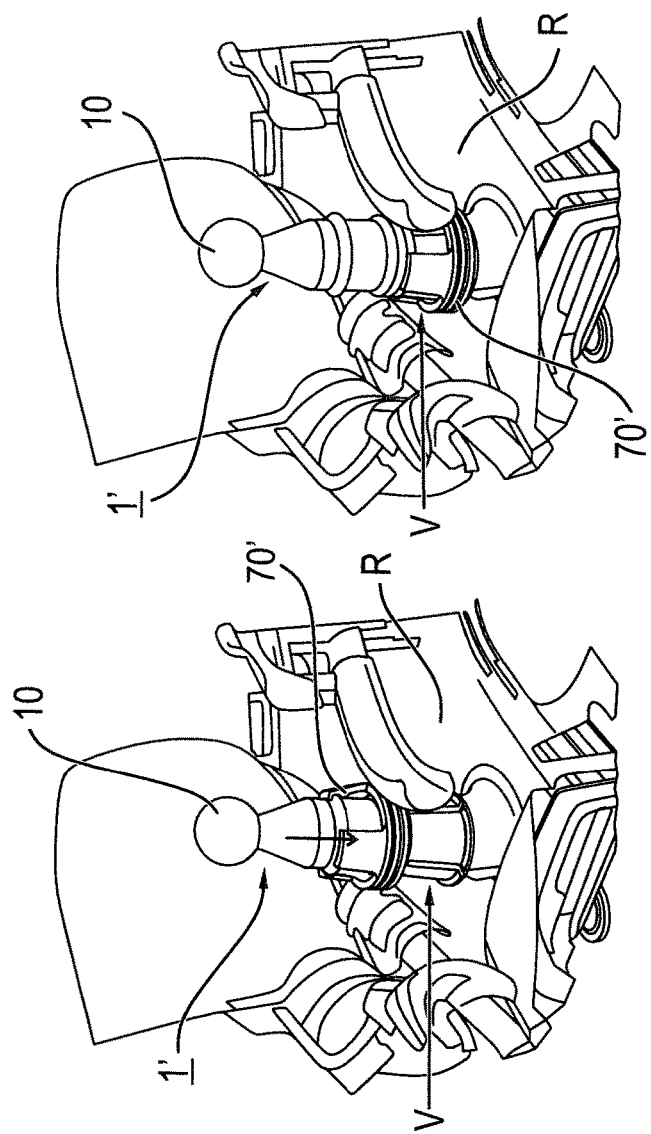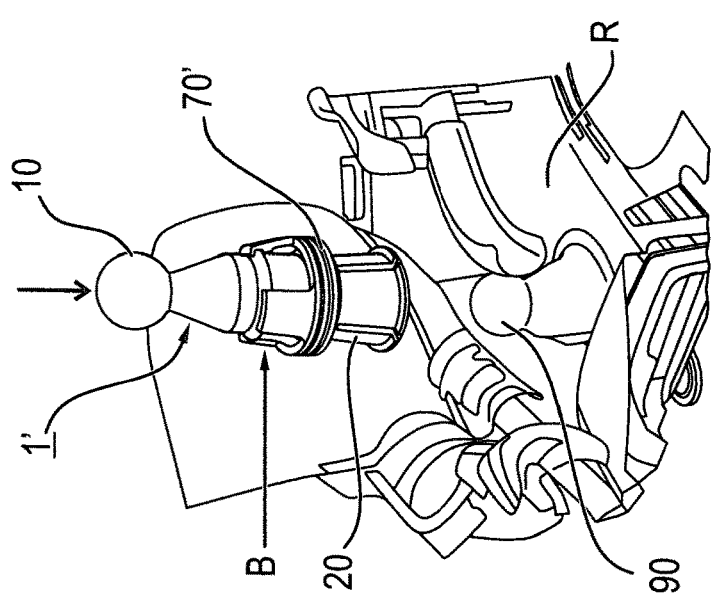
FIG. 9A  FIG. 9B  FIG. 9C

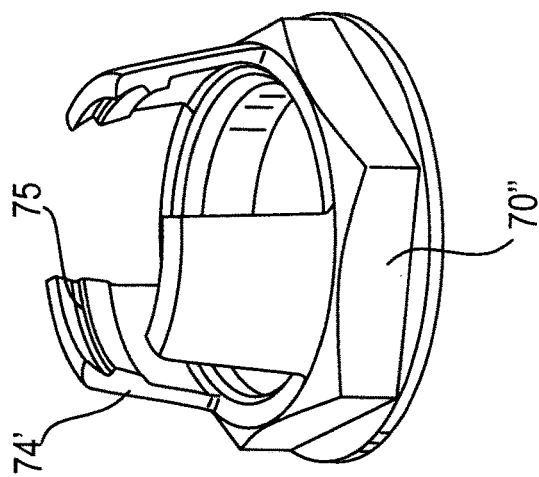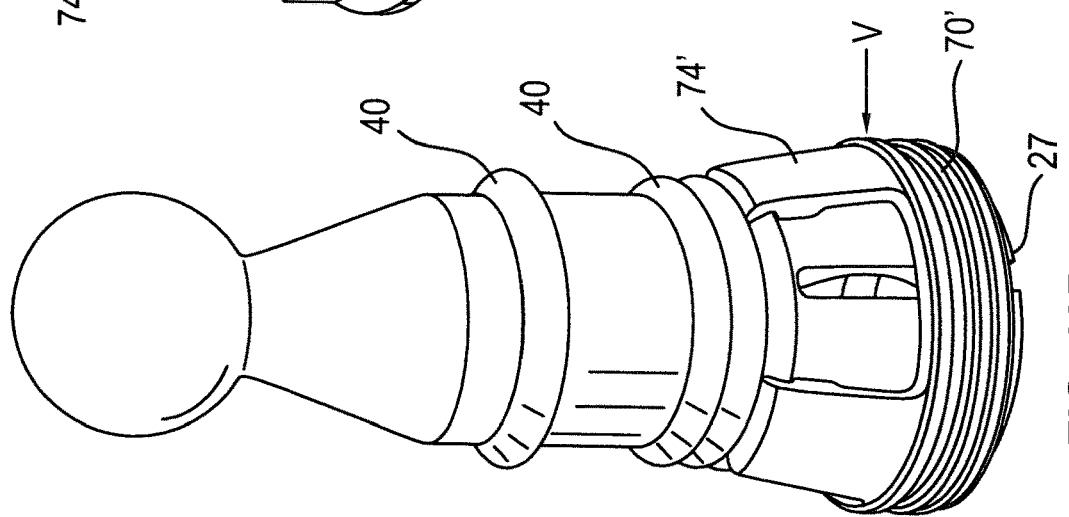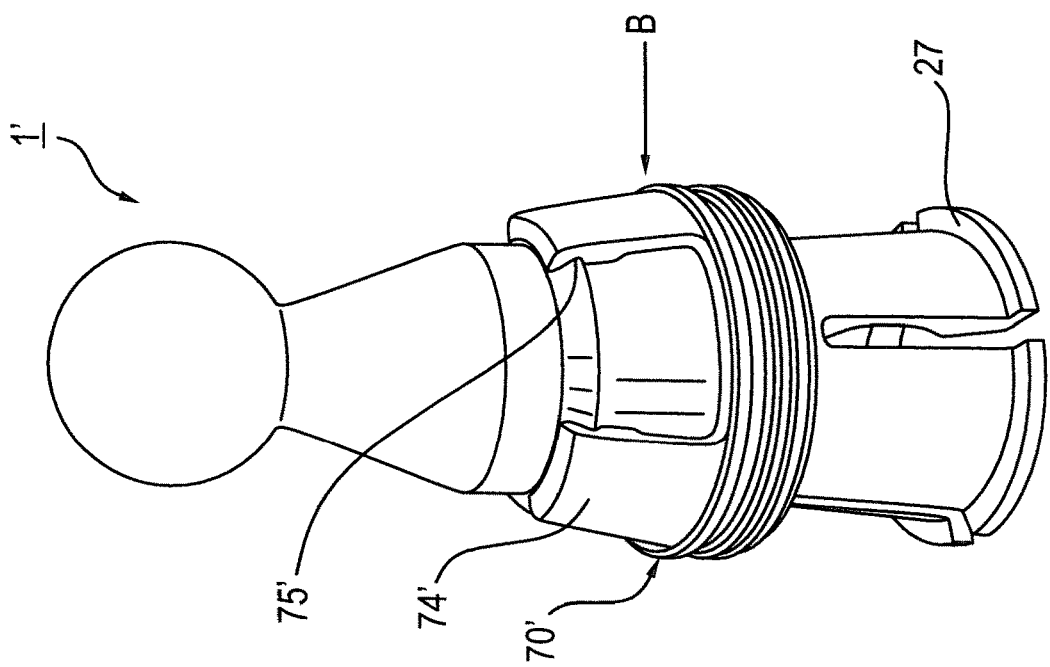

EXTENSION ADAPTER OF A PLUG-IN COUPLING AND ASSOCIATED PRODUCTION AND INSTALLATION METHOD

TECHNICAL FIELD

The present disclosure relates to an extension adapter of a plug-in coupling, with which a free space between a male coupling element and a female coupling element can be bridged in a connecting manner. Further, this disclosure relates to a connection between two components by means of a plug-in coupling and the extension adapter. Furthermore, the present disclosure comprises a production method and an installation method for the extension adapter.

BACKGROUND

In the prior art, various types and constructions of plug-in couplings are known, with which a first and a second component can be connected.

For example, U.S. Pat. No. 8,403,356 discloses a plug-in coupling for fastening an interior paneling structure consisting of at least three parts in the motor vehicle. An intermediate part is used, for example, to realize the distance between the two components to be connected with each other. Furthermore, a male coupling element is used which, similar to a nail, has a large-surfaced head. This male coupling element alone is not able to hold itself in a component opening. Only the combination with a plugged and then latched onto female coupling element ensures the hold in a component opening and the possibility of a connection with another component. Accordingly, a pre-installation of the individual coupling elements in the respective components is not possible, instead, together with the installation of the coupling elements on the respective component, the assembly of the coupling elements and components must follow as well.

Further, DE 197 21 314 A1 describes a two- or multi-part plug-in coupling, which for example also uses a bolt with a ball head, which, thus, is a male coupling element in combination with a ball socket in a female coupling element. The female coupling element comprises some disc-shaped elements as a head, which, lying opposite to each other, form a gap between them. This gap serves to receive or insert the coupling in an edge slot of a component. Thus, the edges of the edge slot are guided rail-like in the two disc-shaped elements. This results in a position specification of the coupling in the edge region of a component. An installation of this coupling in an arbitrarily placed component opening is therefore not possible. The opposite male coupling part is locked, for example, in a component opening, or glued into this, in order to then connect the plug-in coupling.

A similar attachment of a female coupling element is shown in FR 2 932 235. Here, also an elastically formed ball socket is provided, which has a ring-shaped fastening groove for attachment, for example, on a screen. This fastening groove can be slid into lateral slots of the component, wherein after installation of the female coupling element, the coupling element protrudes far beyond the component level. Since the ball socket protrudes beyond the component surface, the ball socket can deform with the ball head installed therein and damp vibrations. This vibration damping is ensured simultaneously by additional recesses parallel to the cavity by inserting the male coupling element.

GB 1 332 397 discloses an, although only distant, yet simple construction of a plug-in coupling in the field of snap fasteners. Both male and female coupling element have a flat head, so that the ball head of the male coupling element and the ball socket of the female coupling element are covered by the flat head. In order to secure the coupling elements in corresponding sections of material, spring washers are pushed onto cylindrical portions of the coupling elements. In this respect, these coupling elements do not provide fastening options with their assigned components or material parts through their own integral structure. Here, as well, the connection of the two coupling elements is made via a latching connection between the male and female coupling element.

Another two-part plug-in coupling is disclosed in DE 201 07 949 U1. A female coupling element consisting of an elastic material is inserted in an installation direction in a component opening. To assist the installation, the female coupling element has a conical shape tapered in the installation direction. In order to support the grip of the female coupling element and not to push the female coupling element beyond the component opening, a flange extending perpendicularly to the installation direction limits the insertion movement in the installation direction. Within the female coupling element, a ball socket is provided, in which a male coupling element, in particular a bolt with a ball head, can be locked. In order to establish a connection between two components, the bolt with ball head is also latched in installation direction within the female coupling element. Thus, in addition to the establishing of the connection between the components, the insertion movement of the bolt with ball head in the ball socket also supports the installation and the firm seat of the female coupling element in the component opening. But here, again, the female coupling element protrudes beyond the component surface. This allows a certain mobility of the ball head of the male coupling element after the installation took place, since the ball head is elastically movable and deflectable together with the largest part of the female coupling element above the component surface. Due to the commutated installation direction of the female coupling element and the establishing of the connection between the female and the male coupling element, the two components are connected with each other in two-sided accessibility.

DE 20 2015 005 870 also describes a two-part plug-in coupling consisting of a male and a female coupling element. The coupling elements are characterized by a flat head section, which enables an almost aligned arrangement with regard to a component surface of a component. The coupling elements described here can be installed in a component opening, wherein the said flat head section remains visible on the component surface after installation in the component opening. This construction has certain aesthetic reasons, as it allows an optimal adaptation of the coupling elements to the component surface despite the small installation space of the coupling elements. Due to this aesthetic construction and arrangement of the coupling elements, however, there is no clearance between the male and female coupling elements to compensate for possible gaps. Since the coupling elements are installed directly in the component opening, the coupling elements are not variable in their positioning. This would be possible, for example, if the coupling elements or at least one of the coupling elements were accommodated in a socket on the bottom side of a component. Since there is no possibility to compensate for tolerances or free spaces, the compensation of these tolerances often leads to a distortion of the aesthetic appearance of the connected components. If the male and female coupling elements have to be forced into the connection, it is often necessary to bend or deform at least one of the components to be connected. If the component to be connected is a motor cover, its original shape will be distorted by the connection in an uncontrolled and, most importantly, unaesthetic manner.

It is thus an object of at least some embodiments of the present invention to compensate possible free spaces between two coupling elements to be connected in such a manner, that this compensation of the free space or the existing tolerances does not lead to a deformation of the components or to an aesthetic disturbance of the connection to be produced.

3. SUMMARY

The above may be achieved by an extension adapter of a plug-in coupling, by a production method, by an installation method of the extension adapter and by a connection between two components with the extension adapter as set forth in this disclosure. Further configurations and further developments are found in the following description, the drawings and the claims.

The present disclosure describes an extension adapter of a plug-in coupling with which a free space between a male coupling element on a first component and a female coupling element on a second component can be bridged in a connecting manner. This extension adapter comprises the following features: at least one male coupling end which can be plugged into the at least one female coupling element, a female coupling end in which the male coupling element can be accommodated and which is connected to the at least one male coupling end preferably via an intermediate piece, and a locking element which is displaceably arranged in the axial direction of the extension adapter with which, in a locking position at least partially surrounding the female coupling end, a release of a male coupling element from the female coupling end is prevented.

As previously described, plug-in couplings for connecting two components are generally well-known. Such a plug-in coupling consists of a male coupling element, for example a bolt with a ball head, and a female coupling element, for example a ball socket formed to fit the ball head. The extension adapter preferably has an elongated structure with a longitudinal axis and a first and a second end. A male coupling end and a female coupling end are arranged at the two oppositely arranged ends, each of which can be latched in or can be connected to a coupling element formed complementary thereto. According to a further embodiment of the extension adapter, the latter is Y-shaped so that it has two male coupling ends and one female coupling end. This means that the coupling ends of the extension adapter always use the well-known connection concepts and constructions of plug-in couplings. In order to ensure a reliable retaining or grip of the extension adapter on the male coupling element, however, the locking element is used to lock a receiving space for the male coupling element in the female coupling end in such a manner, that the male coupling element can no longer be released from the female coupling end of the extension adapter. While the male coupling element in its connected state may still be pivotable in a certain solid angle, it cannot be detached in an axial direction from the female coupling end. This construction ensures that, if a connection between two components is released using a plug-in coupling, still only the plug-in coupling is released. Thus, the extension adapter and the plug-in coupling are not released at the same time, which prevents additional installation effort. To ensure this type of locking as well as the interaction between the locking element and the female coupling end, various constructions of the extension adapter are preferred, as explained below. The Y-shaped design of the extension adapter allows the fastening area between the extension adapter and the second component to be increased by the number of plug-in connections. Thereby, a second component which is difficult to access can be retained more firmly in a limited fastening area by means of several plug-in connections. As a result, in addition to the preferred Y-shape of the extension adapter, other shapes with more than one male and/or more than one female coupling end can also be produced.

The at least one male coupling end of the extension adapter may comprise a thickening, in particular a ball head. Additionally, the female coupling end of the extension adapter may comprise the above-mentioned receiving space, which is defined by a plurality of wall elements, which surround the receiving space spaced apart from each other. It may be preferred to surround the receiving space for the male coupling element by means of an elastic wall. When the male coupling element is inserted into the receiving space, the elastic wall resiliently yields radially outwards. Once the locking element at least partially surrounds the elastic wall, the resilient yielding of the wall is limited and the male coupling element is retained locked in the receiving space.

The extension adapter forms, due to its construction, a locked connection with the male coupling element. In contrast to this, a connection between the male coupling end and the female coupling element is not locked. Therefore, a connection between the male coupling end of the extension adapter and the female coupling element can be established in a well-known manner and with the known forces. These differing connection forces at the female coupling end and at the male coupling end ensure that, when the connection between the two components is released, only the connection between the male coupling end and the female coupling element is released. If the locking of the connection between the female coupling end and the male coupling element would not be provided, then, if the connection between the two components were released, there would be a risk of the two connections between the two coupling ends and the respective coupling element being released as well. This would lead to an indefinable procedure during the disassembly of one of the components, because one or both connections between the respective coupling end and the corresponding coupling element could be released in an uncontrolled manner. Due to the effect of the locking element, after connecting the extension adapter with the male coupling element, the connection is fixed at least in an axial direction. This can be compared to the use of a now longer male coupling element, where the locked connection between the male coupling element and the female coupling end of the extension adapter allows additional range of motion.

The receiving space, which may define a ball socket, comprises, as the surrounding outer wall, a plurality of wall elements spaced apart from each other. These wall elements may be constructed to run in a strip-like manner in an axial direction so that they can spring radially outwards when a male coupling element is inserted. Depending on the flexibility of the material of the female coupling end, the number of wall elements can be adjusted in order to determine the force required to insert the male coupling element. As an alternative to the plurality of wall elements, it is also preferred to provide the female coupling end of the extension adapter as a closed dome with receiving space. Since this dome consists of a sufficiently elastic material, the male coupling element can be inserted in this dome, preferably a ball socket. Now, in order to be able to lock the male coupling element within this female coupling end, the above-mentioned locking element may be arranged leaning against the outer wall of the female coupling end. Since the locking element cannot be moved radially outwards, the locking element may prevent an elastic deformation of the female coupling end and thus a releasing of the male coupling element out of the female coupling end.

According to a further embodiment of the extension adapter, the at least partially surrounding locking element is a ring-shaped or a U-shaped spring clip. According to a further embodiment of the extension adapter, the locking element is a nut element that can be screwed onto a thread on a radial outer side of the female coupling end. It may be preferred that the locking element is formed by a ring element that can be plugged onto a radial outer side of the female coupling end. Generally, the locking member at least partially surrounds the female coupling end, so that a male coupling element received therein is blocked therein in its axial position. This can be accomplished, for example, by a spring clip that is not completely circumferential, and that is circular or U-shaped. According to other preferred configurations, the locking element is formed completely circumferential, as described above, and as described in detail below.

As can be seen from the above alternatives of the locking element, different constructions of the extension adapter are possible without loss of the function of the extension adapter. In addition, the different constructions of the locking element result in different materials that can be used in accordance with the respective use case. For example, the ring-shaped spring clip may consist of metal or plastic. This can be widened by a preferred manual pressure of the worker, so that the locking element can be displaced into a locking position intended for this purpose at the female coupling end. According to another embodiment, the radial outer side of the female coupling end of the extension adapter comprises an outer thread. On this outer thread, the nut element can be screwed onto, which is arranged between the two coupling ends when the extension adapter is in an unlocked state. Once the nut element has been screwed onto the female coupling end, a movement of the radial outer wall of the female coupling end is prevented radially outwards. Here, it is not decisive as to whether the outer wall of the female coupling end consists of a plurality of wall elements or of a continuous elastic wall. Because of its rigid form, the nut element blocks any outward movement of the radial outer wall of the female coupling end. In the same way as the nut element, said ring element also blocks the radial outer side of the female coupling end against a movement in a radial outward direction.

According to a further embodiment of the extension adapter, the ring element comprises a polygonal contour. Such a polygonal contour, which may consist of a hexagon or the like, facilitates the axial displacement of the ring element onto the female coupling end.

Furthermore, it is preferred to provide the locking element of the extension adapter with at least one latching web, which fixes the locking element in a base position and/or the locking position. According to another embodiment of the extension adapter, the base position of the locking element is provided between the male and the female coupling end. The locking element can be latched at least in the base position.

The present disclosure further comprises a connection between two components with an extension adapter according to one of the above-described embodiments, in which a first component is provided with a male coupling element and a second component is provided with a female coupling element, so that the extension adapter bridges a free space between the first and the second component via a connection with the male coupling element and the female coupling element.

Furthermore, the present disclosure comprises a production method for an extension adapter, in particular an extension adapter according to one of the embodiments described above. The production method comprises the following steps: providing a first injection mold which is formed complementary to the extension adapter which comprises a male coupling end which can be plugged into a female coupling element, a female coupling end in which a male coupling element can be received and which is connected to the male coupling end via an intermediate piece, injection molding and demolding the extension adapter, and arranging a locking element on the extension adapter which can be displaced in an axial direction of the extension adapter.

According to the disclosure, the extension adapter may be an injection molded part. Accordingly, the injection mold is formed complementary to the extension adapter. The female and the male coupling end of the extension adapter is therefore specified complementarily by the injection mold in such a way that it fits with known coupling elements. After the elongatedly shaped extension adapter has been injection molded and demolded, the locking element is arranged on the extension adapter. At this point, the locking element may be in a base position in which the male coupling element can still be inserted freely into and released from the female coupling end. Only when the locking element is arranged adjacent to the radial outer wall of the female coupling end, a release of the male coupling element from the female coupling end is accomplished by the locking element.

According to a further embodiment, the production method comprises the further step of injection molding in a second injection mold and demolding the plastic locking element from the second injection mold and then arranging it on the extension adapter. According to the embodiments of the extension adapter described above, different forms or constructions of the locking element can be used. Whereas, according to one embodiment, the locking element consists of a spring clip, the other locking elements can be produced, for example, by the injection molding method mentioned above. Accordingly, the injection mold then determines in a complementary design the above-described nut element, the ring element or a ring element with polygonal contour.

It is also preferred to provide latching webs in the design of the injection mold, which are integrally formed with the ring element or the ring element with polygonal contour. These latching webs may extend in the axial direction of the locking element. In addition, these latching webs may also interact with one or more latching structures on the extension adapter. These latching structures ensure a latching and thus a securing of the position of the locking element. Therefore, it is initially preferred to provide a latching position in combination with the locking position of the locking element. According to a further embodiment, a base position between the female and the male coupling end of the extension adapter also comprises a latching position. Especially the latching possibilities in combination with the base position realize a loss prevention device or loss protection for the extension adapter with locking element before it has been installed.

According to a further embodiment, the injection molding of the locking element in the first injection mold with the extension adapter contained therein is performed by means of a two-component injection molding method, so that the locking element is frictionally and/or, by means of at least one tear-off web, releasably attached to the extension adapter. In the well-known two-component injection molding method, two parts, namely the extension adapter and the locking element, are produced in a single injection mold with at least a first and a second plastic shot. For this, the plastic shots can use the same or different plastics. The plastic shots are performed offset in time from one another so that the plastics of the plastic shots do not mix with one another.

The present disclosure further comprises an installation method of the extension adapter, with which the free space between a male coupling element and a female coupling element is bridged and which comprises at least one male coupling end which can be plugged into the female coupling element, and a female coupling end in which the male coupling element can be received and which is connected to the at least one male coupling end via an intermediate piece, as well as a locking element arranged displaceably in the axial direction of the extension adapter, wherein the installation method comprises the following steps: plugging the at least one male coupling end into the at least one female coupling element, plugging the male coupling element into the female coupling end of the extension adapter and displacing the locking element into a locking position, in which the locking element at least partially surrounds the female coupling element, so that a releasing of the male coupling element from the female coupling end is prevented.

The installation method comprises the further step of extending a ring-shaped spring clip as a locking element, so that the spring clip can be plugged onto the female coupling end. In the same way, it is also preferred to screw a nut-like locking element onto the female coupling end. Preferably, for this purpose, the female coupling end comprises on its radial outer side an outer thread adjusted to the nut-like locking element. According to a further embodiment of the installation method, a ring-shaped locking element is plugged onto the female coupling end. It may be preferred to plug a second male coupling end into a second female coupling element, whereby the extension adapter is formed in a Y-shape.

Furthermore, the present disclosure comprises a connection between two components with an extension adapter of the above-described forms, in which a first component with a male coupling element and a second component with at least one female coupling element are formed, so that the extension adapter bridges the free space between the first and the second component via a connection with the male coupling element and the at least one female coupling element.

4. BRIEF DESCRIPTION OF THE ACCOMPANYING DRAWINGS

Figure 2:
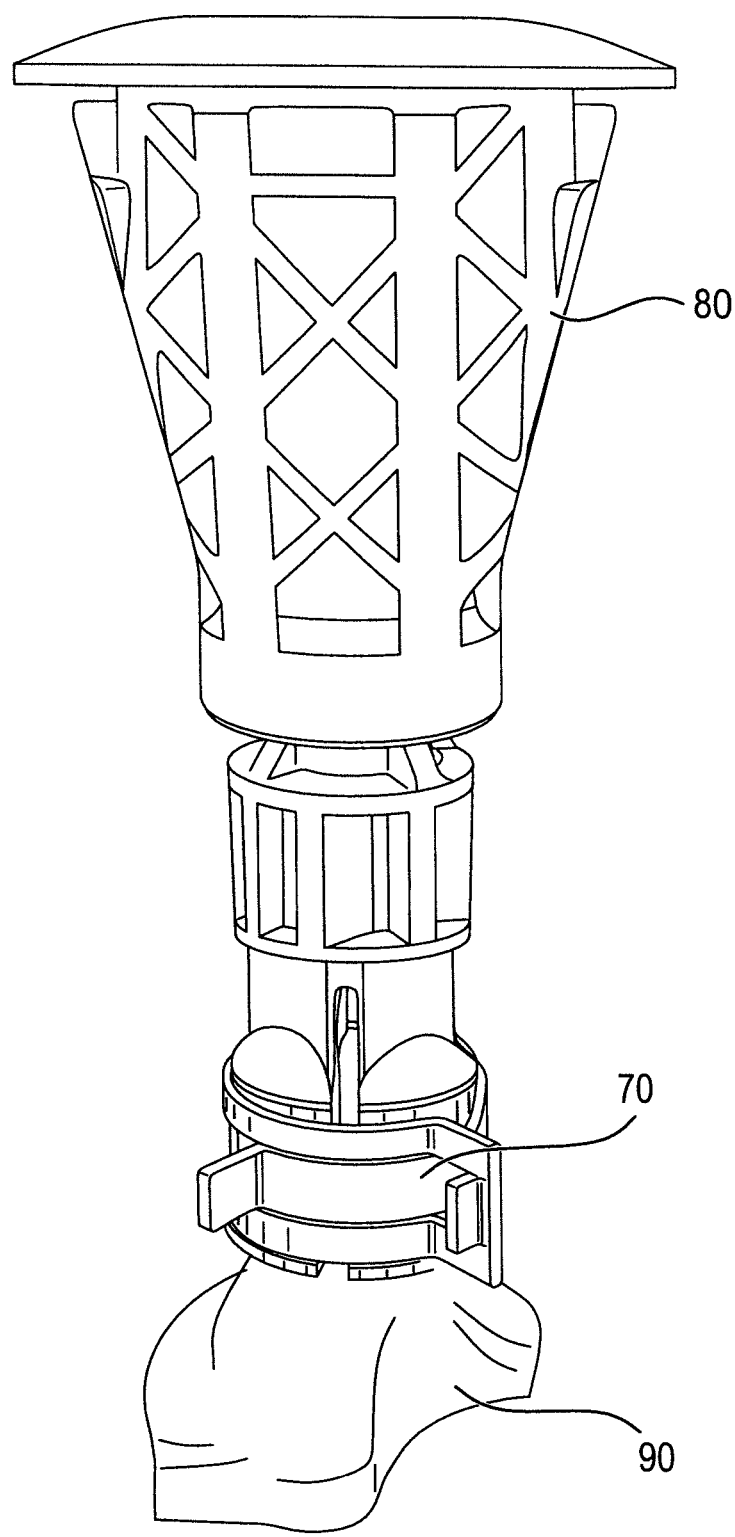
Figure 3:
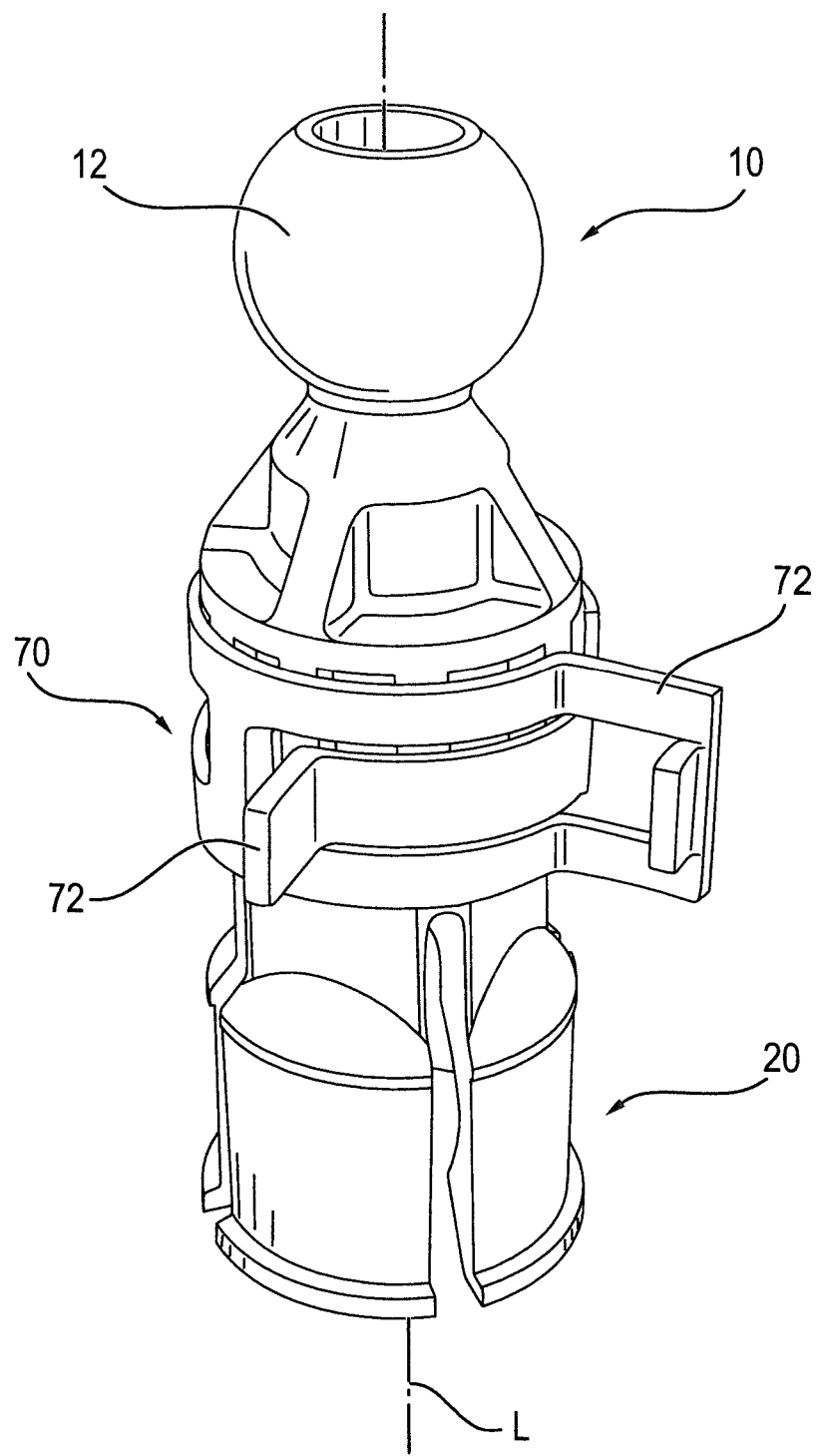
Figure 4:
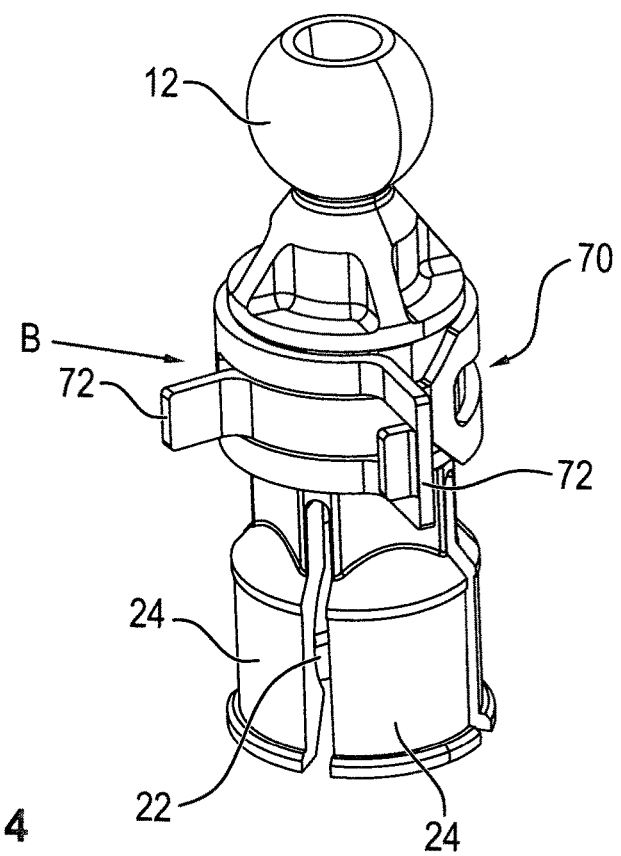
Figure 5:
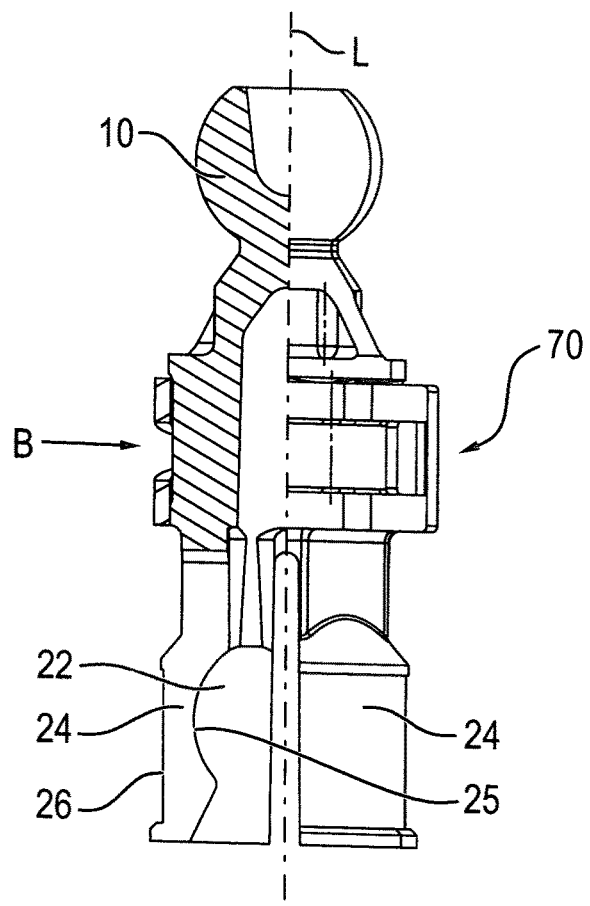
Figure 6:
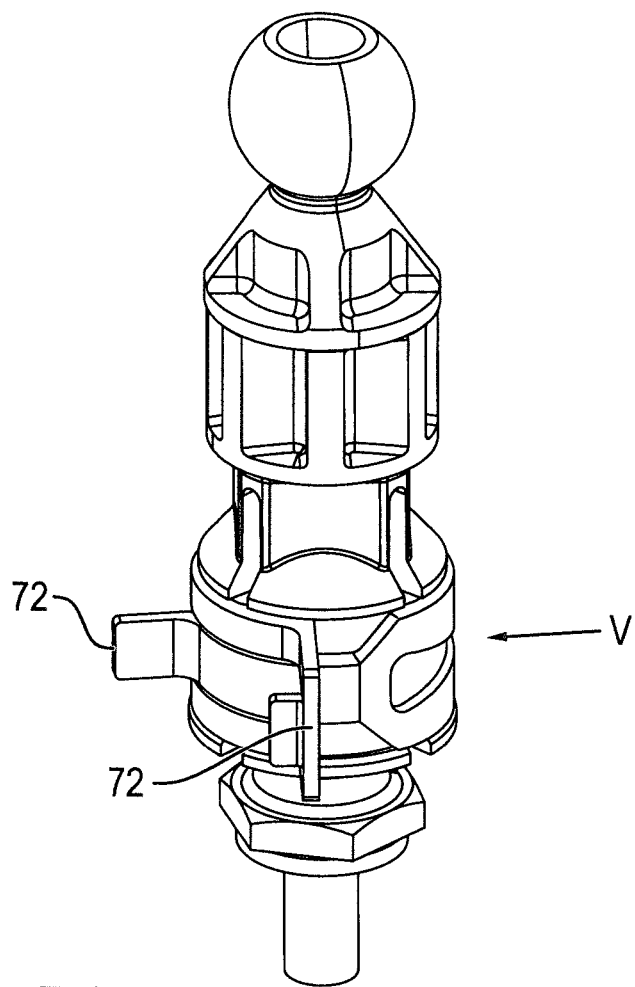
Figure 7:
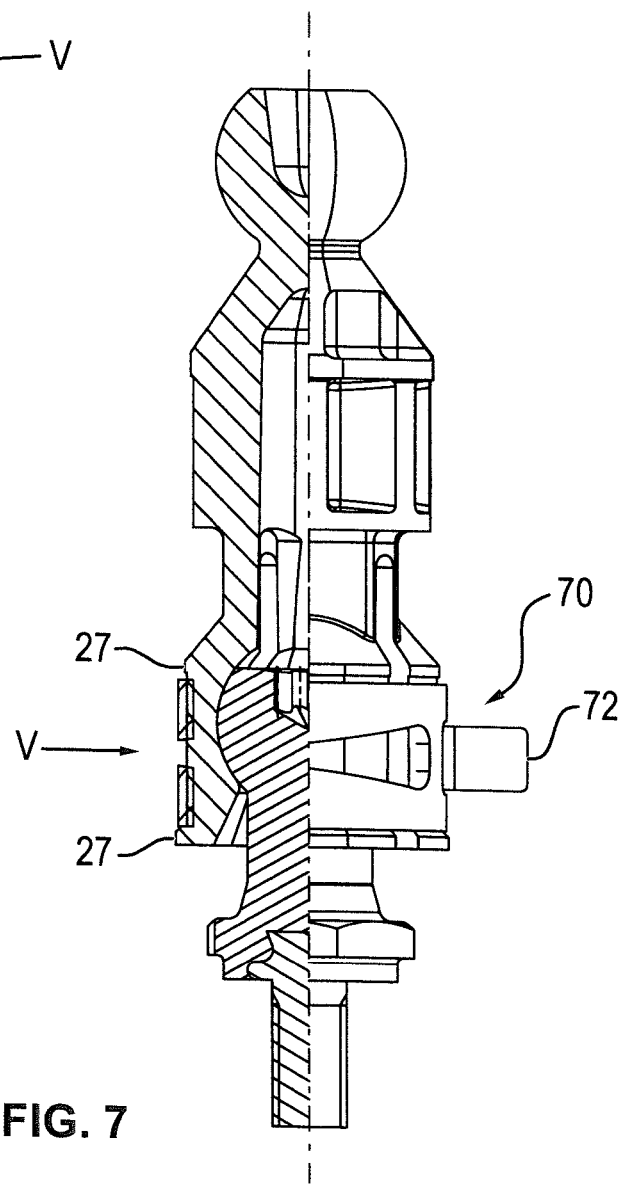
Figure 12:
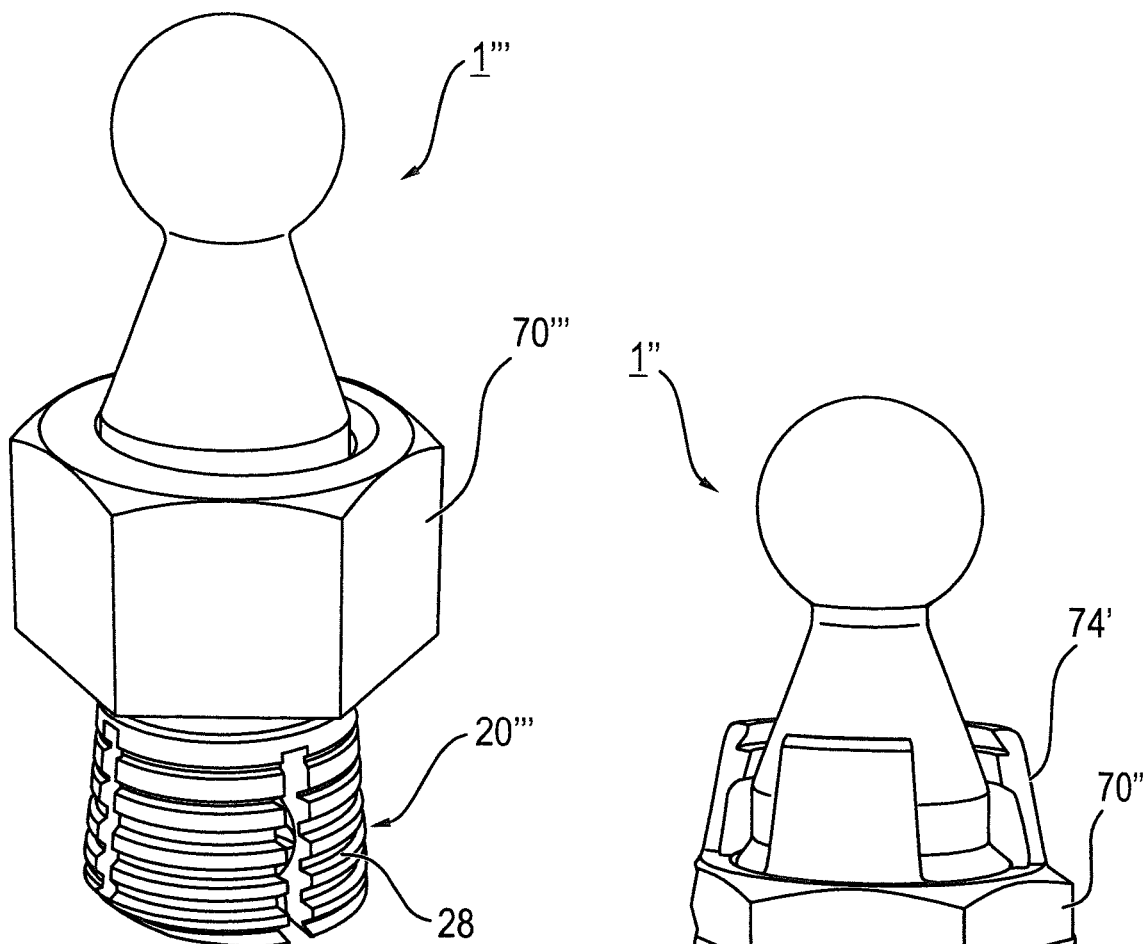
Figure 13:
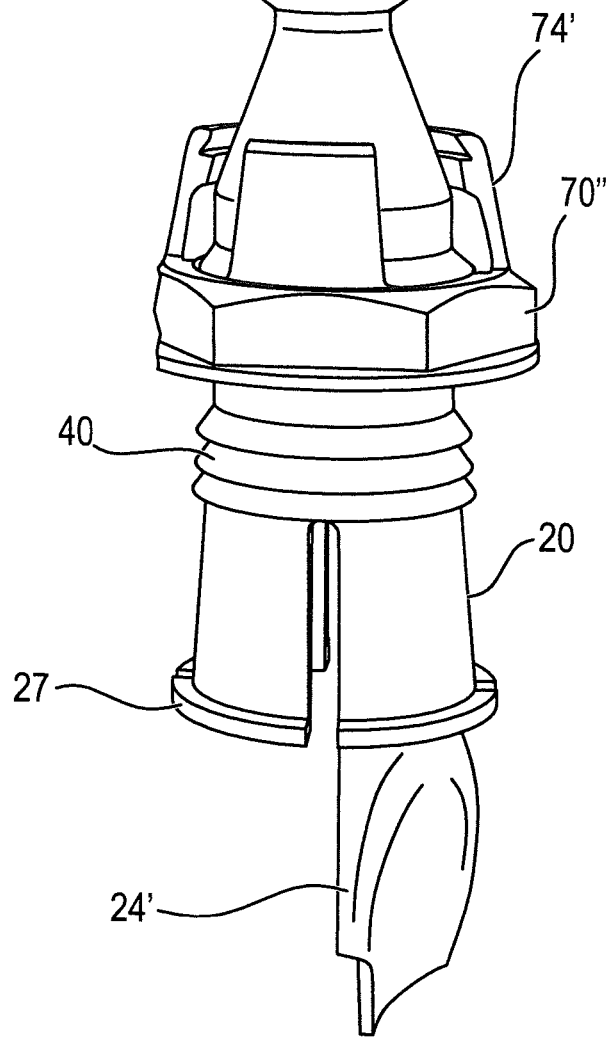
Figure 14:
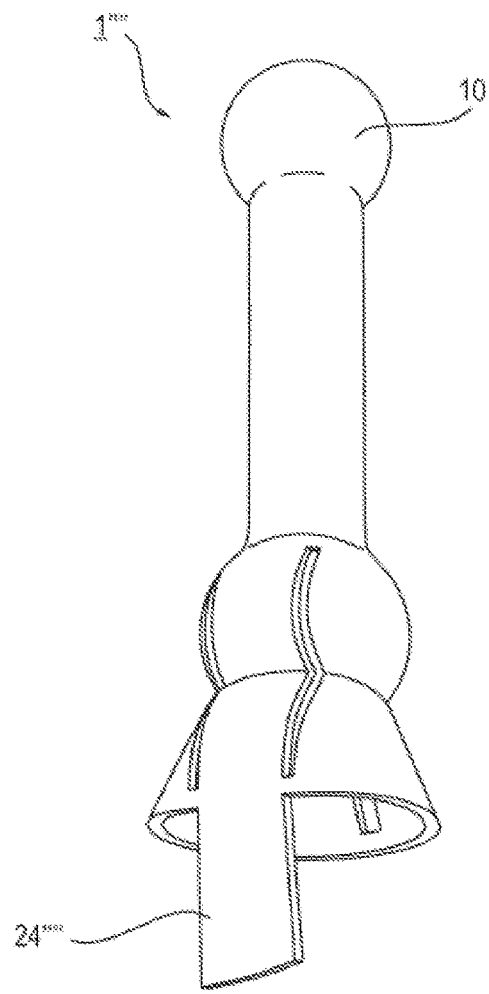
Figure 16:
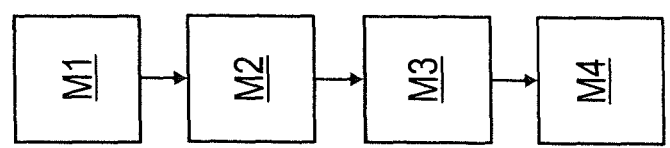
Figure 15:
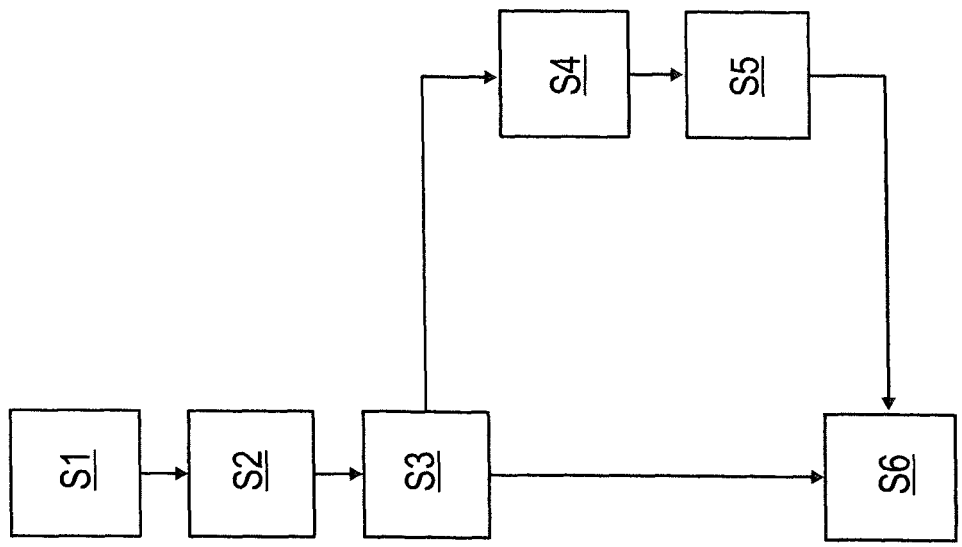

The embodiments of the present disclosure will be explained in more detail with reference to the accompanying drawing. It shows:

FIG. 1 is a perspective illustration of a connection between two components by means of the extension adapter, FIG. 2 is the extension adapter in combination with a male and a female coupling element, FIG. 3 is a perspective view of a further embodiment of the extension adapter with a spring clip as locking element, FIG. 4 is a further embodiment of the extension adapter with a spring clip as locking element, FIG. 5 is a partial sectional view of the embodiment according to FIG. 4, FIG. 6 is the extension adapter according to FIG. 4 with the male coupling element inserted and the spring clip in locking position, FIG. 7 is a partial sectional view of the embodiment according to FIG. 6, FIGS. 8*a*, 8*b*, 8*c* are different installation sequences of a locking element on the extension adapter and of the extension adapter on the male coupling element, FIGS. 9*a*, 9*b*, 9*c* are schematic illustrations of installation steps of the extension adapter, FIGS. 10*a*, 10*b* are the extension adapter with a further locking element and its installation, FIG. 11 is a further embodiment of a locking element, FIG. 12 is a further embodiment of the extension adapter, FIG. 13 is a further embodiment of the extension adapter, FIG. 14 is a further embodiment of the extension adapter, FIG. 15 is a flow chart of a production method of the extension adapter, and FIG. 16 is a flow chart of an installation method of the extension adapter.

Figure 17:
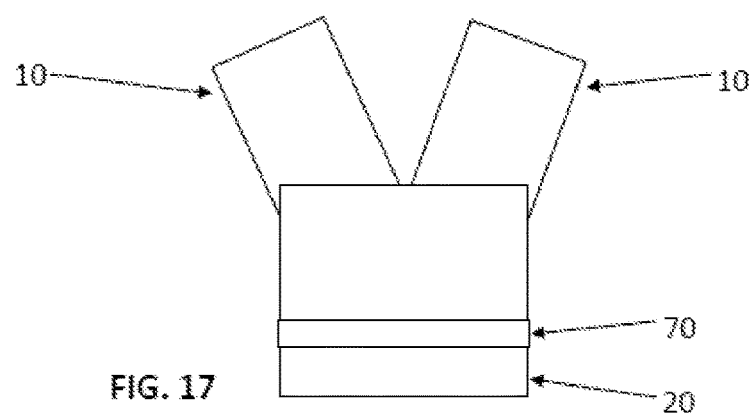

FIG. 17 is a diagrammatic illustration of a Y-shaped extension adapter.

5. DETAILED DESCRIPTION

FIG. 1 shows a connection between a frame structure R as a first component and a cover A as a second component. The cover A is provided with a female coupling element 80, while a male coupling element 90 is attached to the frame structure R. The male coupling element 90 is preferably a ball bolt, while the female coupling element 80 is fittingly formed as a ball socket. Other well-known plug-in couplings can also be used as male coupling element 90 and female coupling element 80, as for example discussed above with reference to the prior art.

In FIG. 1, it is clearly visible that between the cover A and the frame structure R, a free space F is present. This cannot be bridged by the male 90 and the female coupling element 80 alone. To bridge the free space F and to connect the cover A with the frame structure R, an extension adapter 1 is provided, which is shown enlarged and in different preferred embodiments in FIGS. 3 to 8 and 10 to 14. In order to establish a connection with the frame structure R and the cover A, accordingly, the extension adapter 1 has a male 10 and a female coupling end 20. The coupling ends 10, 20 are formed fitting and preferably complementary to the female 80 and male coupling element 90. Between the male 80 and the female coupling element 90 an intermediate piece 50 is preferably provided, which is explained in more detail below. The male coupling end 10 is received in the female coupling element 80 and is retained therein. A preferred female coupling element 80 is described in DE 20 2015 005 870, which is hereby incorporated by reference. It comprises a ball socket into which the male coupling end 10 snaps to be retained releasably therein.

While the shown extension adapter 1 illustrates an elongated structure, a construction with preferably several male coupling ends 10 (not shown) can also be used. According to one embodiment, for this, the extension adapter 1 is formed Y-shaped, such as is shown in FIG. 17. However, other shapes are also possible.

The male coupling end 10 may comprise a ball head 12, which can also be formed flat, oval, spherical, ball-like, asymmetrically thickened or similar. The male coupling end 10 forms one end of the elongated extension adapter 1. The female coupling end 20 is arranged opposite the male coupling end 10 in the longitudinal direction of the extension adapter 1. The female coupling end 20 is adjusted to receive a ball head of a ball pin as male coupling element 90 or a similar known structure to establish a positive connection with the male coupling element 90. The female coupling end 20 may include a receiving space 22 which may be in the form of a ball socket. Instead of the ball socket, other forms of the receiving space 22 are also preferred as long as they can be used to establish a positive latching connection with a correspondingly shaped male coupling element 90.

The receiving space 22 is enclosed circumferentially by a plurality of wall elements 24. At least two wall elements 24 may be provided, whereby also three to eight, preferably four wall elements 24 ensure an ideal retention of the male coupling element 90 in the receiving space 22. Alternatively, a continuous wall made of elastic material is preferably provided. A radial inner side 25 of the wall element 24 or the wall determines the shape of the receiving space 22, in this case the ball socket. Accordingly, the radial inner sides 25 of the wall elements 24 or the wall together determine the inner contour of the receiving space 22.

It is further preferred that the wall elements 24 are formed springily due to their choice of material and/or their dimensioning, while the continuous wall may consist of elastic material which yields to itself. As soon as the male coupling element 90 is released from or inserted into the receiving space 22, the wall elements 24/the wall spring radially outwards and then return to their initial position. This movement may ensure that the male coupling element 90 snaps or latches into the receiving space 22. The following explanations on the locking of the male coupling element 90 in the receiving space 22 apply in the same way to the wall elements 24 and the continuous elastic wall (not shown).

On a radial outer side 26 of the wall elements 24, a locking position V is defined. It is used for the arrangement of a locking element 70, which may be provided as a spring clip 70 in the embodiment shown in FIGS. 4 to 7. The locking element 70 has the function of limiting or preventing a radial outward movement of the wall elements 24. In this way, the receiving space 22 is locked against the release of a male coupling element 90 located therein. As can be seen from FIGS. 9 to 13, different forms of the locking element 70 are preferred. The choice of the locking element 70 may vary with the strength of the desired locking, the accessibility of the extension adapter 1 during installation and during the establishing of the connection between the two components and with the available installation space.

The extension adapter 1 shown in FIGS. 3 to 7 utilizes as locking element the spring clip 70, which circumferentially surrounds the female coupling end 20 and thus the plurality of wall elements 24. The spring clip 70 is configured in such a way that it engages around and springily clips a body with a round cross-section. The spring clip 70 may comprise at least two radial webs 72, which can be displaced relative to each other in the circumferential direction of the spring clip 70. If the radial webs 72 are moved towards each other using a tool or manually by the force of a worker, the inner circumferential extension of the spring clip 70 increases. In this way the spring clip 70 is released, from a base position B between the male 10 and the female coupling end 20, is extended circumferentially and can be displaced axially in the longitudinal direction L of the extension adapter 1. In the same way, a release from the locking position V takes place to release and remove the spring clip 70 from the plurality of wall elements 24 and to remove the male coupling element 90 out of the female coupling end 20. After the spring clip 70 has been released from the base position B, it is axially displaced in the extended state and arranged radially adjacent to the wall elements 24. Before the spring clip 70 is positioned in this way, the male coupling element 90 has already been arranged in, and may be snapped into, the female coupling end 20. Now the radial webs 72 are removed from each other so that the spring clip 70 reduces its inner diameter due to its inherent spring tension. As soon as the spring clamp 70 is fittingly positioned in the locking position V on the radial outer side 26 of the wall elements 24, the radial webs 22 are completely released. Due to its inherent spring force, the spring clip 70 presses the wall elements 24 radially inwards, preferably against the male coupling element 90, so that this is thereby retained in the receiving space 22.

In order to support the arrangement of the spring clip 70 in the locking position V, the radial outer side 26 of the wall elements 24 or at least a selection of wall elements 24 has at least one, preferably two, radial collars 27. The radial collars 27 limit the locking position V in axial direction and thus support a fast and precise positioning of the spring clip 70.

According to a further embodiment of the present disclosure, the intermediate piece 50 is arranged between male 10 and female coupling end 20. It is also preferred to reduce the intermediate piece 50 to a minimum length or to omit it completely, so that the male 10 and the female coupling element 20 directly adjoin each other.

It is also preferred to arrange the male 10 and female coupling end 20 axially to each other via an adjustable threaded connection. For this purpose, the male and the female coupling end 10, 20 may be provided on separate axial pieces. These axial pieces have thread sections complementary to each other in order to connect the axial pieces to each other. According to a further design, the axial pieces are formed as telescopic rods, so that their total length can be adjusted as plug-in, screw- or plug-and-screw connections. Depending on how far the thread sections are screwed onto each other, the total length of the interconnected axial pieces is freely adjustable. The same function can also be realized via a variable-length plug-in connection.

This thread- or plug-in connection ensures a free length adjustment of the extension adapter 1. It is understood that the above-described constructive and functional features and procedures with regard to the extension adapter 1 with spring clip 70 shown in the described figures also apply in the same way or analogously to the further preferred embodiments of extension adapter 1 with alternative locking elements.

Figure 8C:
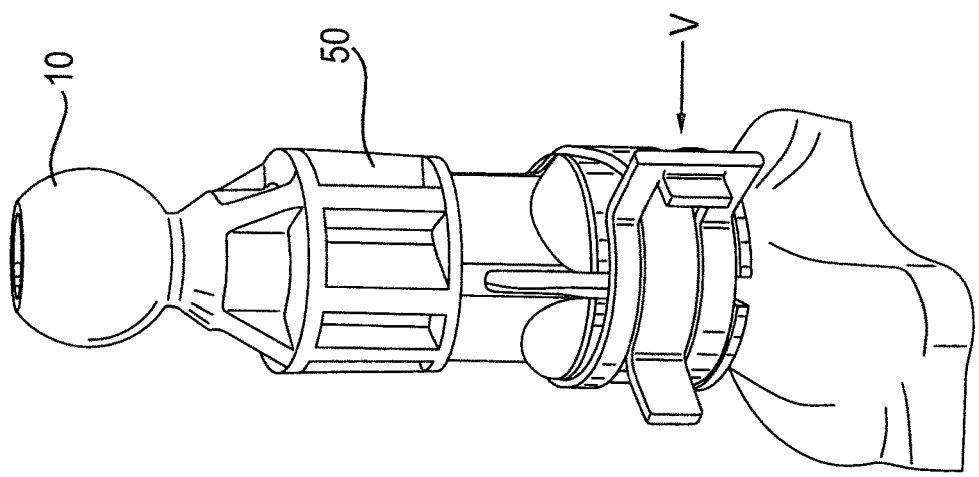
Figure 8B:
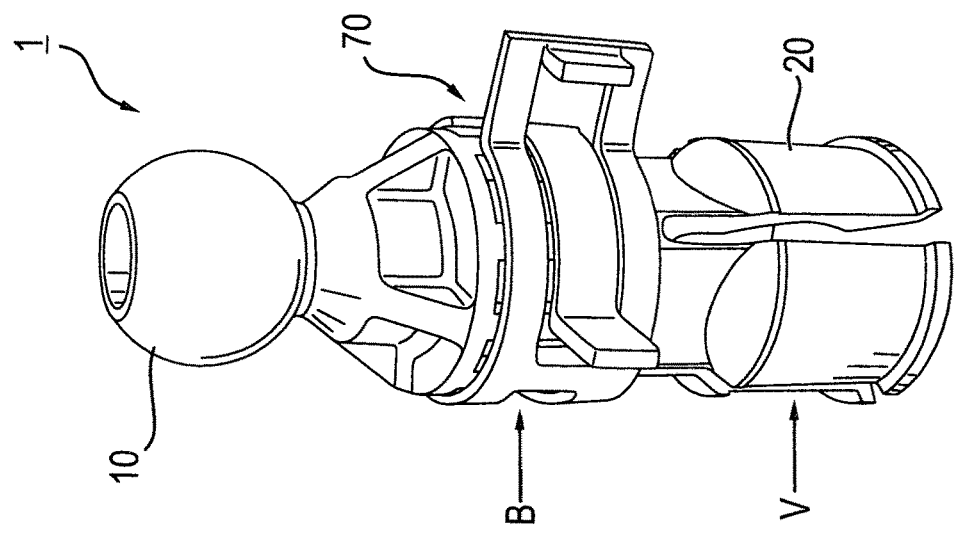
Figure 8A:
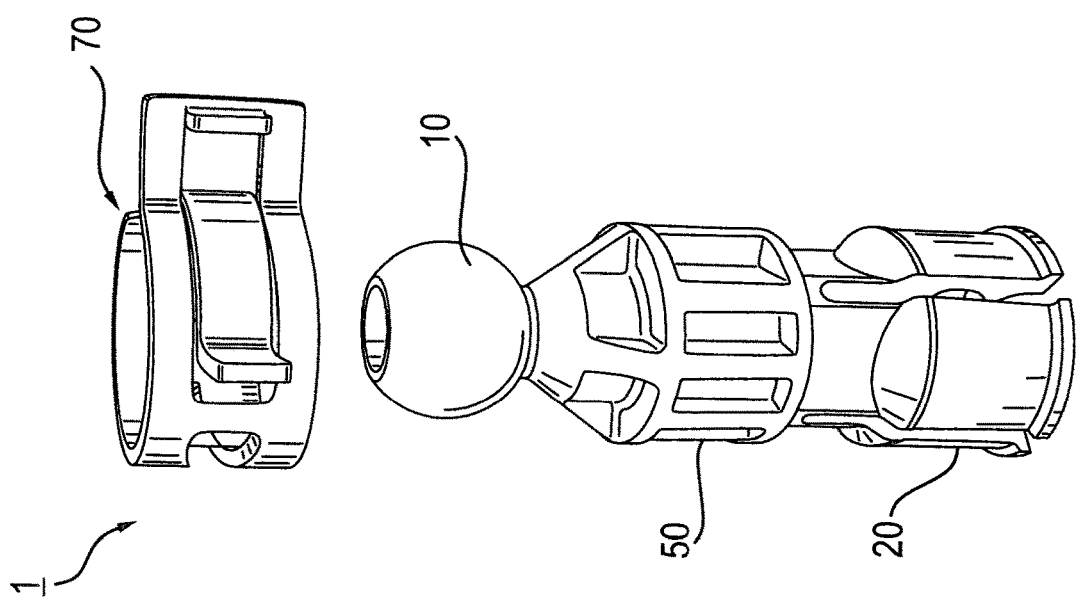

FIG. 8(a) shows the extension adapter 1 and the spring clip 70 side by side. Preferably, the extension adapter 1 was previously produced (S2) by means of an injection molding method in a mold (S1) formed complementary to the construction of the extension adapter 1 and demolded (S3) from this mold. In the following, the spring clip 70 is arranged (S6) preferably in the base position B as an example for the locking element. If the locking element should consist of plastic according to another preferred embodiment, it is first produced by means of injection molding (S4) and demolded (S5), before it can be arranged (S6) on the extension adapter 1 (see FIG. 15).

According to a method alternative, it is preferred to injection-mold the extension adapter 1 and the locking element 70, provided they consist of plastic, in the first injection mold with the extension adapter 1 contained therein by means of a two-component injection molding method. In this method, the extension adapter 1 and the locking element 70 are fixed to the extension adapter 1 by friction and/or by means of a plurality of tear-off webs after the production is completed. The term two-component injection molding includes those methods in which two different plastic types or plastic modifications are combined with each other in one process via injection molding. A different plastic modification denotes the same type of plastic, but with different fillers, such as dyes (multi-color injection molding), reinforcing or fiber material of known plastics, such as glass fibers, different proportions of reinforcing material or different plasticizers or different proportions thereof. This type of primary forming offers great potential in terms of cost optimization and rationalization, because complex parts with several functional requirements (e.g. several colors, hard/soft, etc.) can be produced in a single work step and without extensive reworking. In this method, two different plastics in the form of two plastic shots are injected offset in time into an injection mold to produce a part consisting of two components. It is also possible to inject the same plastic into the injection mold in two or more shots offset in time. The components produced by the respective shot are formed in an adjacent arrangement in the injection mold without flowing into each other. It is also preferable that the cavities of the injection mold, which are delimited from each other, are filled with the same or different plastics at the same time or offset in time in order to form the above-mentioned components. Thereby, it is preferred that the several components, here the extension adapter 1 and the locking element 70, are connected to each other via a plurality of tear-off webs. Tear-off webs refer to web-like bridges between the plastic parts 1, 70 which, due to their small diameter, can be severed without any mechanical effort.

After the extension adapter has been produced, it is preferred to arrange the male coupling element 90 in the female coupling end 20. Then, the male coupling element 90 is locked therein by arranging the locking element 70 on the female coupling end 20, preferably on the wall elements 24. This is shown as an example in FIG. 8(*c*). The same procedure is illustrated by another embodiment of the extension adapter 1' in FIG. 9. First, the extension adapter 1' is arranged adjacent to the male coupling element 90 and then plugged onto the male coupling element 90. In FIG. 9, the male coupling element 90 preferably consists of a bolt with a ball head. The ball head snaps into the ball socket of the female coupling end 20 in order to bridge the free space F. Subsequently, the locking element 70' is arranged in the form of a ring element on the radial outer side 26 of the wall elements 24 in order to lock (M3) the ball head in its position (see FIG. 9(*c*). Finally, the male coupling end 10 is latched into the female coupling element 80 to establish (M4) the connection between the two components. Before the locking element can be displaced preferably in the form of the spring clip 70, the latter is first extended as described above (M2). In the same way it is preferred to screw a nut-like locking element 70' onto the female coupling end 20 (FIG. 12) or to plug a ring-like locking element 70" onto the female coupling end 20 (see below M3, FIG. 10*a, b*). It is understood that steps M1 and M4 can be interchanged during installation.

A further embodiment of the extension adapter 1' is shown in FIG. 10. Here, the locking element 70' is formed in the shape of a ring element. The ring element 70' can be displaced axially on the extension adapter 1'. In order to fix the ring element 70' releasably in the base position B and the locking position V, the ring element 70' comprises at least one axially extending latching web 74'. The at least one latching web 74', preferably 2 to 5, is integrally formed on one axial end face of the ring element 70' and preferably extends in the direction of the male coupling end 10. The latching webs 74', here preferably 3, are inclined radially inwards in order to preferably abut on the extension adapter 1' with a certain spring tension. In addition, it is preferred that at least one latching groove 75' is provided on a radial inner side of the latching webs 74'. The latching groove 75' interacts with circumferentially arranged latching webs 40, which are pressed into the latching groove 75' by the spring force of the latching webs 74'. Several latching webs 40 may be positioned to retain the locking element 70' in the base position B on the one hand and in the locking position V on the other hand. It is understood that the arrangement of the latching webs 40 and the latching groove 75' can also be interchanged.

An inner diameter of the ring element 70' is chosen such that the ring element 70' can be pushed onto the female coupling end 20 in order to lock the male coupling element 90 arranged therein. The ring element 70' is axially displaced manually. Thereby, the above-described radial collar 27 may provide an abutment face for the ring element 70', as can be seen in FIGS. 10*a* and *b*.

A further embodiment of the ring element 70''' or the locking element 70" is shown in FIG. 11. In contrast to the ring element 70" of FIG. 10, the ring element 70" is formed as a polygonal construction, while the remaining construction features are the same as the ring element 70". The polygonal construction allows the ring element 70" to be installed on the female coupling end 20 by means of a nut. The extension adapter 1" with polygonal ring element 70" is shown in a preferred configuration in FIG. 13. In addition to the locking element 70", an axially extended wall element 34' is also provided here. As soon as the female coupling end 20 has been plugged onto the male coupling element 90, the extended wall element 24' is blocked against radial deflection on the second component by means of a suitable abutment. This also supports a locking of the male coupling element 90 in the female coupling end 20.

FIG. 12 shows a preferred extension adapter 1''', the locking element 70''' of which is formed by a nut-like element 70''' or generally by a threaded element. The nut-like element 70''' comprises an inner thread which is formed fittingly to an outer thread 28 on the radial outer side 26 of the wall elements 24 of the female coupling end 20. In order to lock the male coupling element 90 in the female coupling end 20''', the nut-like locking element 70' is screwed onto the female coupling end 20'. Preferably, the radial collar 27 prevents that the nut-like locking element 70' is screwed beyond the female coupling end 20 by the extension adapter 1'''.

A further embodiment of the extension adapter 1" is shown in FIG. 14. This extension adapter 1"" comprises a locking element in the form of an axially extended wall element 24". Similar to the embodiment in FIG. 13, the extended wall element 24" locks the female coupling element 20"" via abutment against the second component. In addition, the female coupling end 20"" may consist of only two wall elements, of which only the extended wall element 24" can be springily moved radially outwards. By means of this construction, an insertion and locking of the male coupling element 90 in the female coupling end 20"" is ensured.

The invention claimed is:

1. Extension adapter of a plug-in coupling, with which a free space between a male coupling element arranged on a first component and at least one female coupling element arranged on a second component can be bridged in a connecting manner, and which has the following features:
   a. at least one male coupling end which comprises a thickening and can be latched into the at least one female coupling element,
   b. a female coupling end in which the male coupling element can be latched and which is connected to the at least one male coupling end via an intermediate piece, wherein
   c. the female coupling end comprises a receiving space, which is defined by a plurality of wall elements, which surround the receiving space spaced apart from each other, or which is defined by a continuous elastic wall, and
   d. a locking element which is displaceably arranged in the axial direction of the extension adapter with which, in a locking position at least partially surrounding the female coupling end, a release of a male coupling element from the female coupling end is prevented while a connection between the male coupling end and the female coupling element is not locked so that when the connection between the first and the second components is released, only the connection between the male coupling end and the female coupling end is released.

2. Extension adapter according to claim 1, wherein the thickening is a ball head.

3. Extension adapter according to claim 1, in which the locking element in the locking position surrounds the plurality of wall elements in such a way that these non-releasably retain a male coupling element received in the receiving space.

4. Extension adapter according to claim 1, in which the at least partially surrounding locking element is a ring-shaped or a U-shaped spring clip.

5. Extension adapter according to claim 1, in which the locking element is a nut element that can be screwed onto a thread on a radial outer side of the female coupling end.

6. Extension adapter according to claim 1, in which the locking element is a ring element that can be plugged onto a radial outer side of the female coupling end.

7. Extension adapter according to claim 6, the ring element of which comprises a polygonal contour.

8. Extension adapter according to claim 6, in which the locking element comprises at least a latching web, which fixes the locking element in a base position and/or the locking position.

9. Extension adapter according to claim 1, which comprises a base position of the locking element between male and female coupling element and the locking position, wherein the locking element preferably can be latched at least in the base position.

10. Extension adapter according to claim 1, which comprises a first and a second male coupling end so that the extension adapter is formed Y-shaped.

11. Production method for an extension adapter according to claim 1, comprising the following steps:
   a. providing a first injection mold, which is formed complementary to the extension adapter, which comprises a male coupling end which comprises a thickening and can be latched into a female coupling element, a female coupling end in which a male coupling element can be latched and which is connected to the male coupling end via an intermediate piece, wherein the female coupling end comprises a receiving space, which is defined by a plurality of wall elements, which surround the receiving space spaced apart from each other, or which is defined by a continuous elastic wall,
   b. injection molding and demolding of the extension adapter, and
   c. arranging a locking element displaceable in the axial direction of the extension adapter on the extension adapter so that in a locking position at least partially surrounding the female coupling end, a release of the male coupling element from the female coupling end is prevented while a connection between the male coupling end and the female coupling element is not locked.

12. Production method according to claim 11, with the further step:
   d. injection molding in a second injection mold and demolding the plastic locking element from the second injection mold and thereafter arranging it on the extension adapter.

13. Production method according to claim 11, with the further step:
   injection molding of the locking element in the first injection mold with the extension adapter contained therein by means of a two-component injection molding method, so that the locking element is frictionally and/or, by means of at least one tear-off web, releasably attached to the extension adapter.

14. Installation method of the extension adapter according to claim 1, with which a free space between a male coupling element and a female coupling element is bridged and which comprises at least one male coupling end which comprises a thickening and can be latched into the female coupling element, and a female coupling end in which the male coupling element can be latched and which is connected to the at least one male coupling end via an intermediate piece, wherein the female coupling end comprises a receiving space, which is defined by a plurality of wall elements, which surround the receiving space spaced apart from each other, or which is defined by a continuous elastic wall, as well as a locking element arranged displaceably in the axial direction of the extension adapter, wherein the installation method comprises the following steps:
   a. plugging the at least one male coupling end into the at least one female coupling element,
   b. plugging the male coupling element into the female coupling end of the extension adapter, and
   c. displacing the locking element into a locking position, in which the locking element at least partially surrounds the female coupling end, so that a releasing of the male coupling element from the female coupling end is prevented while a connection between the male coupling end and the female coupling element is not locked.

15. Installation method according to claim 14, with the further step:
   d. extending a ring-shaped spring clip as a locking element, so that the spring clip can be plugged onto the female coupling end.

16. Installation method according to claim 14, with the further step:
   e. screwing a nut-like locking element onto the female coupling end.

17. Installation method according to claim 14, with the further step:
   f. plugging a ring-shaped locking element onto the female coupling end.

18. Installation method according to claim 14, with the further step:

plugging a second male coupling end into a second female coupling element, whereby the extension adapter is formed in a Y-shape.

19. Connection between two components with an extension adapter according to claim 1, in which a first component is provided with a male coupling element and a second component is provided with at least one female coupling element, so that the extension adapter bridges a free space between the first and the second component via a connection with the male coupling element and the at least one female coupling element.

\* \* \* \* \*